UNITED STATES PATENT OFFICE.

LEWIS N. LYE, OF ALLEN COUNTY, ASSIGNOR OF ONE-HALF HIS RIGHT TO FRANCIS J. LYE, OF DELPHOS, OHIO.

IMPROVEMENT IN ANTI-INCRUSTATION COMPOUNDS.

Specification forming part of Letters Patent No. 171,297, dated December 21, 1875; application filed November 19, 1875.

*To all whom it may concern:*

Be it known that I, LEWIS N. LYE, in the county of Allen and State of Ohio, have invented certain new and useful Improvements in Compounds for Removing Incrustations from Steam-Boilers; and I do hereby declare that the following is a full, clear, and exact description thereof, that will enable others skilled in the art to which it appertains to make and use the same.

I use for old boilers one gallon crude coal-oil, one pint coal-oil, one pound concentrated lye. This compound I use to remove incrustation in old boilers. After it is removed, or in new boilers, I take one gallon crude coal-oil, one pound stearine, and half a pound of bees-wax, to prevent incrustation and to form a gloss on the iron, which prevents any foreign substance from adhering to it. Applied by pumping in with the water, or in any other convenient way, it dissolves the lime and mud in old boilers, when the refuse is blown out with the water. A gloss is formed on the surface of the iron, which prevents any foreign substance from adhering to the boiler or flues. In fact, if my compound is used in new boilers, and the use is properly continued, no incrustation, lime, mud, or foreign substance will be formed on the boiler. In such case it is evident that the boiler will last many years longer, and will save at least thirty per cent. in fuel.

Having fully described my invention and its use, what I claim, and desire to secure by Letters Patent, is—

A composition, to remove and prevent incrustation and foaming in steam-boilers, compounded of crude coal-oil, concentrated lye, coal-oil, bees-wax, and stearine, substantially as directed, and for the purpose set forth.

In testimony that I claim the foregoing I have hereunto set my hand this 23d day of August, 1875.

L. N. LYE.

Witnesses:
C. C. MARSHALL,
JOHN KING.